(12) United States Patent
Schlecht

(10) Patent No.: US 7,621,577 B2
(45) Date of Patent: Nov. 24, 2009

(54) AUTOMATICALLY OPENING CARGO COMPARTMENT COVER

(75) Inventor: Werner Schlecht, Vaihingen/Enz-Aurich (DE)

(73) Assignee: BOS GmbH & Co. KG, Ostfildern (DE)

( * ) Notice: Subject to any disclaimer, the term of this patent is extended or adjusted under 35 U.S.C. 154(b) by 273 days.

(21) Appl. No.: 11/904,428

(22) Filed: Sep. 27, 2007

(65) Prior Publication Data

US 2008/0088145 A1 Apr. 17, 2008

(30) Foreign Application Priority Data

| Sep. 27, 2006 | (DE) | ......................... 10 2006 046 065 |
| Sep. 27, 2006 | (DE) | ......................... 10 2006 046 069 |
| Oct. 13, 2006 | (DE) | ......................... 10 2006 049 065 |
| Nov. 13, 2006 | (DE) | ......................... 10 2006 053 680 |
| Sep. 27, 2007 | (DE) | ......................... 10 2006 046 064 |

(51) Int. Cl.
*B60N 3/00* (2006.01)

(52) U.S. Cl. .................................. 296/24.4; 296/37.16

(58) Field of Classification Search ................ 296/24.4, 296/100.4, 100.17, 100.18, 37.16, 98, 37.8
See application file for complete search history.

(56) References Cited

U.S. PATENT DOCUMENTS

| 4,168,094 | A | * | 9/1979 | Yagi | ......................... | 296/37.16 |
| 5,676,415 | A | * | 10/1997 | Ament et al. | ............. | 296/37.16 |
| 6,125,908 | A | * | 10/2000 | Ament et al. | ............. | 296/37.16 |
| 6,416,103 | B1 | | 7/2002 | Laudenbach et al. | | |
| 6,834,705 | B2 | | 12/2004 | Seel | | |
| 6,843,518 | B2 | * | 1/2005 | Schlecht et al. | ........... | 296/24.34 |
| 6,930,592 | B2 | * | 8/2005 | Schlecht et al. | ........ | 340/426.29 |
| 6,966,591 | B2 | * | 11/2005 | Schlecht | ................... | 296/24.43 |
| 7,014,239 | B2 | * | 3/2006 | Ehrenberger | ............... | 296/37.1 |
| 7,055,877 | B2 | * | 6/2006 | Sparrer et al. | ............. | 296/24.43 |
| 7,316,440 | B2 | * | 1/2008 | Walter et al. | ............. | 296/37.16 |
| 7,445,262 | B2 | * | 11/2008 | Zaiser et al. | ............. | 296/24.43 |
| 7,537,265 | B2 | * | 5/2009 | Hori et al. | ............... | 296/100.15 |
| 2004/0000797 | A1 | | 1/2004 | Laudenbach et al. | | |
| 2004/0069424 | A1 | | 4/2004 | Seel | | |
| 2005/0179275 | A1 | | 8/2005 | Zaiser et al. | | |
| 2007/0007783 | A1 | * | 1/2007 | Schlecht | ..................... | 296/24.4 |
| 2007/0096487 | A1 | * | 5/2007 | Woerner | ..................... | 296/37.1 |
| 2007/0194584 | A1 | | 8/2007 | Zaiser et al. | | |

FOREIGN PATENT DOCUMENTS

| DE | 19825353 | A1 | 12/1998 |
| DE | 19844207 | A1 | 4/2000 |
| DE | 10055949 | A1 | 5/2002 |
| DE | 20211074 | U1 | 1/2003 |
| DE | 102004008874 | A1 | 9/2005 |
| EP | 1084907 | A2 | 3/2001 |
| EP | 1375791 | A2 | 9/2005 |
| EP | 1574394 | A1 | 9/2005 |
| JP | 11286243 | A | 10/1999 |

* cited by examiner

*Primary Examiner*—Kiran B. Patel
(74) *Attorney, Agent, or Firm*—Leydig, Voit & Mayer, Ltd.

(57) ABSTRACT

A cargo compartment cover is provided that includes guide rail arrangements on either side of the cover sheet in order to bring the cover sheet into a intermediate position starting from the closed position. To transfer the cover sheet between these two positions, two separate gear motors are provided which are not synchronized together. The gear motors run completely independently of one another electrically and mechanically.

17 Claims, 4 Drawing Sheets

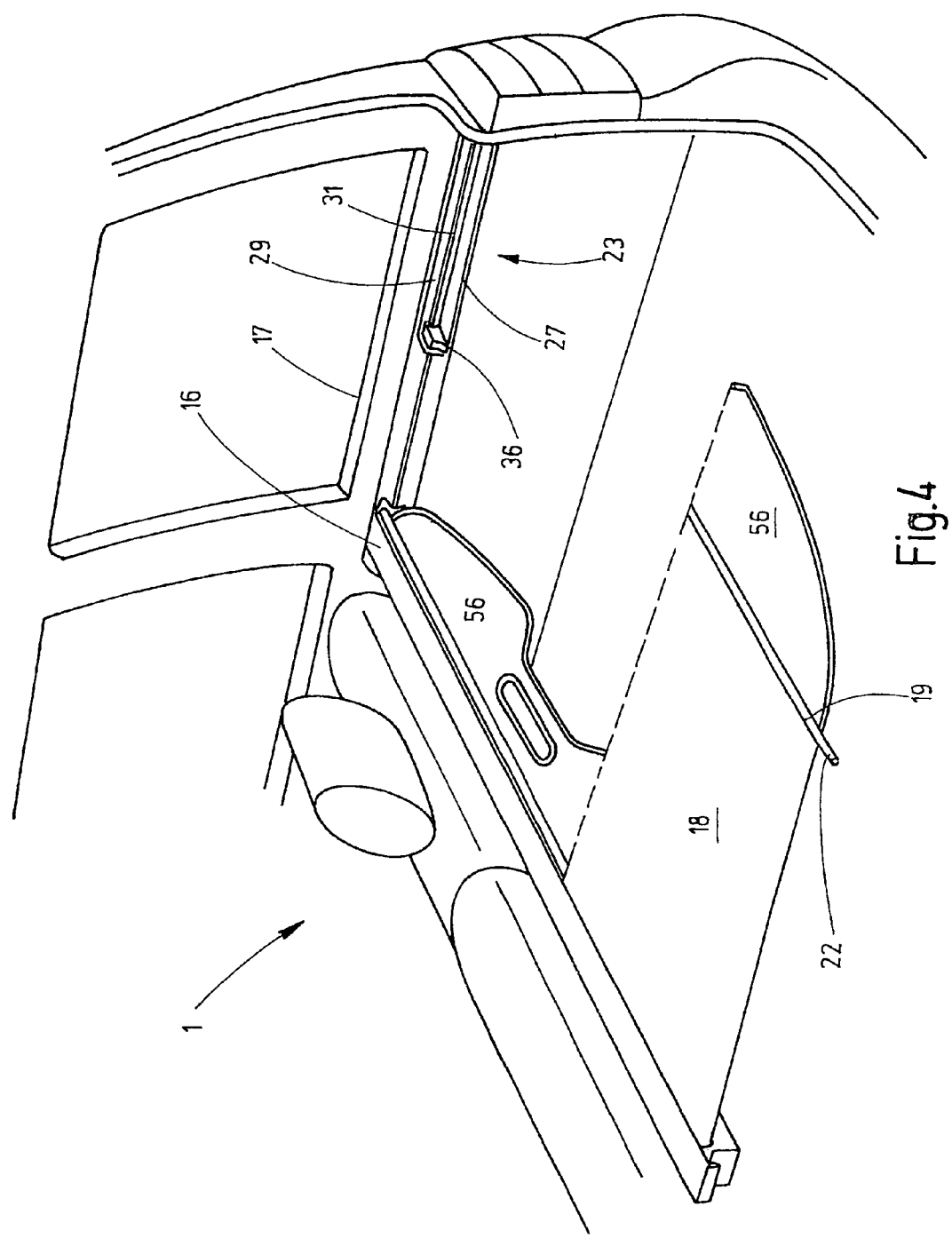

AUTOMATICALLY OPENING CARGO COMPARTMENT COVER

FIELD OF THE INVENTION

The present invention relates to cargo compartment covers for motor vehicles.

BACKGROUND OF THE INVENTION

The use of cargo compartment covers for closing the cargo bay of a station wagon is known from the prior art. Such cargo compartment covers are constructed in the manner of a roller blind. A winding shaft is rotatably seated in an elongated cassette or housing detachably arranged in the vehicle behind the rear seatback. The winding shaft is biased with the aid of a spring motor in a roll-up direction of the cover sheet, one edge of which is fastened to the winding shaft.

A contour part with a handle is situated at the other edge of the cover sheet. The contour part can be gripped manually and moved by pulling out the cover sheet in the direction toward the tailgate opening. There the contour part is appropriately hooked into a laterally projecting pin. This spring motor holds the cover sheet under tension.

A refinement of such a roll-up cover is known from EP 1084907 A2. The disclosed roll-up cover which automatically goes into a partially open position when the rear door is opened. This is intended to increase the convenience of use. It is normally not necessary to open the cover sheet completely for loading or removing objects from the cargo compartment. A partial opening which extends only far enough to enable unobstructed access is necessary. In the arrangement according to EP 1084907 A2 this is achieved by moving the contour part in the direction towards the roof via guide rails that are inserted into the D-column. For this purpose, guide rail arrangements that have two guide groups are present in the D-columns. A pin of the contour part runs in one of these guide groups, while an actuation member is guided in a buckling-free manner in the other. The pin is connected to the actuating member by a coupling part, which is connected in the first guide groove and in the second guide groove.

For driving the actuating members, a single electric motor is provided which bears an output gear with which the two actuation members, which are constructed as flexible racks with teeth on all sides, are in positive engagement. Due to this arrangement one of the actuating members is relatively short, while the other must also be run over the entire width of the cargo compartment bottom thereby producing a corresponding amount of friction. In addition, the placement of the additional guide that connects the motor to the guide rail on the opposite side of the door is expensive and complicated.

A cargo compartment cover in which the cover sheet need only be moved horizontally is described in DE 19825353 A1. Two guide rails, to which end parts of the contour part are connected and with which they are guided, run along the lateral edges of the cargo bay. Deflection rollers in the form of toothed belt pulleys are provided at the front and rear end in each of the guide rails. An endless toothed belt, whose upward facing operating strand bears a coupling part for the lateral pins of the contour parts, runs around each two pulleys of a guide rail. For each guide rail, the belt pulley situated at the front end of the cargo bay is driven via its own an electric motor. In order to reliably prevent uneven movement of the contoured part in the opening or closing movement, the operation of the two motors is synchronized electrically via of an expensive synchronization circuit. Electrical synchronization is technically difficult, and presumes gear motors that contain additional sensors in order to enable an electrical synchronization.

OBJECTS AND SUMMARY OF THE INVENTION

In view of the foregoing, a general object of the present invention is to create a cargo compartment cover which can be brought into an intermediate position and that is cost effective relative to its mechanical and the electrical systems. The cargo compartment cover of the present invention serves in the customary manner for closing off the upper access opening of a cargo bay in a station wagon. The cargo compartment cover includes a rotatably seated winding shaft, to which one edge of a cover sheet is fastened. The cover sheet can be moved manually back and forth between an open position and a closed position. In the open position the cargo bay is completely open, while the cargo bay is completely closed in the close position apart from the opening which otherwise closes the tailgate. In addition to the open and closed operating positions of the cover sheet, an intermediate position is provided into which the cover sheet is automatically brought when the tailgate is opened.

A pullout bar in the form, for example, of a contour part is attached to the cover sheet. This pullout bar runs in two guide rail arrangements that extend only along the path which the pullout bar follows when it is moved into the intermediate position starting from the closed position.

To move the pullout bar, i.e. to move the cover sheet into the intermediate position or from the intermediate position into the closed position, two linear actuation members are provided, each running in a respective one of the guide rail arrangement. Positively engaging stops are provided to directly or indirectly limit the movement of the actuating members.

Two coupling members or coupling parts are also provided, by way of which the respective actuating member can be positively coupled to one end of the pullout bar, at least with respect to one direction of motion.

Two gear motors running at the same nominal speed are provided for driving the actuating members. Each gear motor can be a permanently excited DC motor. The two motors are mechanically and electrically decoupled, and the arrangement overall is free of any electrical or mechanical devices that synchronize the movement of the motors while they are running. Apart from turning on simultaneously, the two gear motors run completely autonomously.

Applicant has found that DC motors of the same model by the same manufacturer run at practically the same actual speed if they are dimensioned for the same nominal speed. The speed deviations between the two motors are so small that the travel difference of the two actuating members during the movement of the pullout bar between the closed position and the intermediate position is practically not noticeable. Due to the positively engaging stops, the same end position is automatically provided even in case of a deviation of the actual speed. When the two motors are set in motion in the opposite direction, they again start at the same position at the same time so that even if there is a difference in speed, the difference does not accumulate over time. Therefore, mechanical and electrical synchronization devices can be completely eliminated.

The cost of the electrical system remains low because electrical synchronization devices are absent. Since no mechanical synchronization devices are present and each actuating member is self-driven, the friction losses remain small because the drive motors can be provided directly next to the guide rail arrangements.

There are basically two possible locations for the pullout bar in the intermediate position. One is in the vicinity of the upper tailgate. With such an arrangement, the guide rails are also placed in the D-column and extend from a point corresponding to the closed position of the cargo compartment cover to the vicinity of the upper edge of the hatchback opening.

The other possible location for the intermediate position lies on the path between the closed position and a completely open position. For this arrangement, the guide rail arrangements begin at the hatchback opening and run for a distance in the direction of the rear seatback.

A simple and space-saving overall construction is obtained if the actuating members bear teeth on their outer side. Such actuating members can be driven with gear motors having an appropriate gear on their output shaft which is positively engaged with the teeth. Any travel length differences as a result of slippage are effectively eliminated.

For an arrangement in which the intermediate position places the pullout bar in the vicinity of the upper edge of the hatchback opening, it is advantageous if an inlet funnel, whose opening points in the direction of the rear seatback, is provided at the lower end of the guide rail arrangement.

The guide rail arrangements are each composed of a first guide groove and a second guide groove. A pin or projection of the pullout bar and a coupling member run in the first guide groove. The actuation member which can be guided in a buckle-free manner depending on the implementation, is situated in the second guide groove. The coupling member is connected to the actuation member by means of an intermediate piece via a slot that connects the two guide grooves.

In the case of a guide rail arrangement in the D-column, the first guide groove can be slot-like, i.e. it is delimited by two sides and a back wall.

Another possibility, which is particularly advisable for a horizontal guide rail arrangement, is to furnish the guide groove with only two walls running at an angle to one another, so that the guide groove is opened both towards the top and in the direction of the opposite vehicle side. It therefore becomes possible to unhook the cover sheet from the coupling member at any desired position and to transfer it manually into the completely open position. This guide rail arrangement construction is in principle also possible for the implementation with guide rail arrangements in the D-column.

In the simplest case, the coupling part that connects the actuation member to the pullout bar can have a fork-like shape having two legs that delimit a slot-like opening. Depending on the position of the guide rail arrangement, this opening can point in the direction parallel to the movement and away from the winding shaft, or the opening can be oriented orthogonally to the direction of movement. The latter is an option for the housing of the guide rail arrangement in the D-column.

The description of preferred embodiments below explains the aspects necessary for an understanding of the invention. It is clear that a number of variations are possible. Further details not described can be deduced in the customary manner by a person skilled in the art from the drawings, which in that respect supplement the description of preferred embodiments.

The drawings below are not necessarily to scale. It may be the case that certain areas are enlarged for an illustration of the essential details. Moreover, the drawings are simplified and do not contain every detail necessary for a practical embodiment.

Other objects and advantages of the invention will become apparent upon reading the following detailed description and upon reference to the drawings, in which:

BRIEF DESCRIPTION OF THE DRAWINGS

FIG. 4 is a partially cutaway perspective view of the cargo compartment area of an exemplary station wagon equipped with an alternative embodiment of a cargo compartment cover according to the present invention in which the intermediate position of the cargo compartment cover lies between the open and closed positions.

Figure 1:
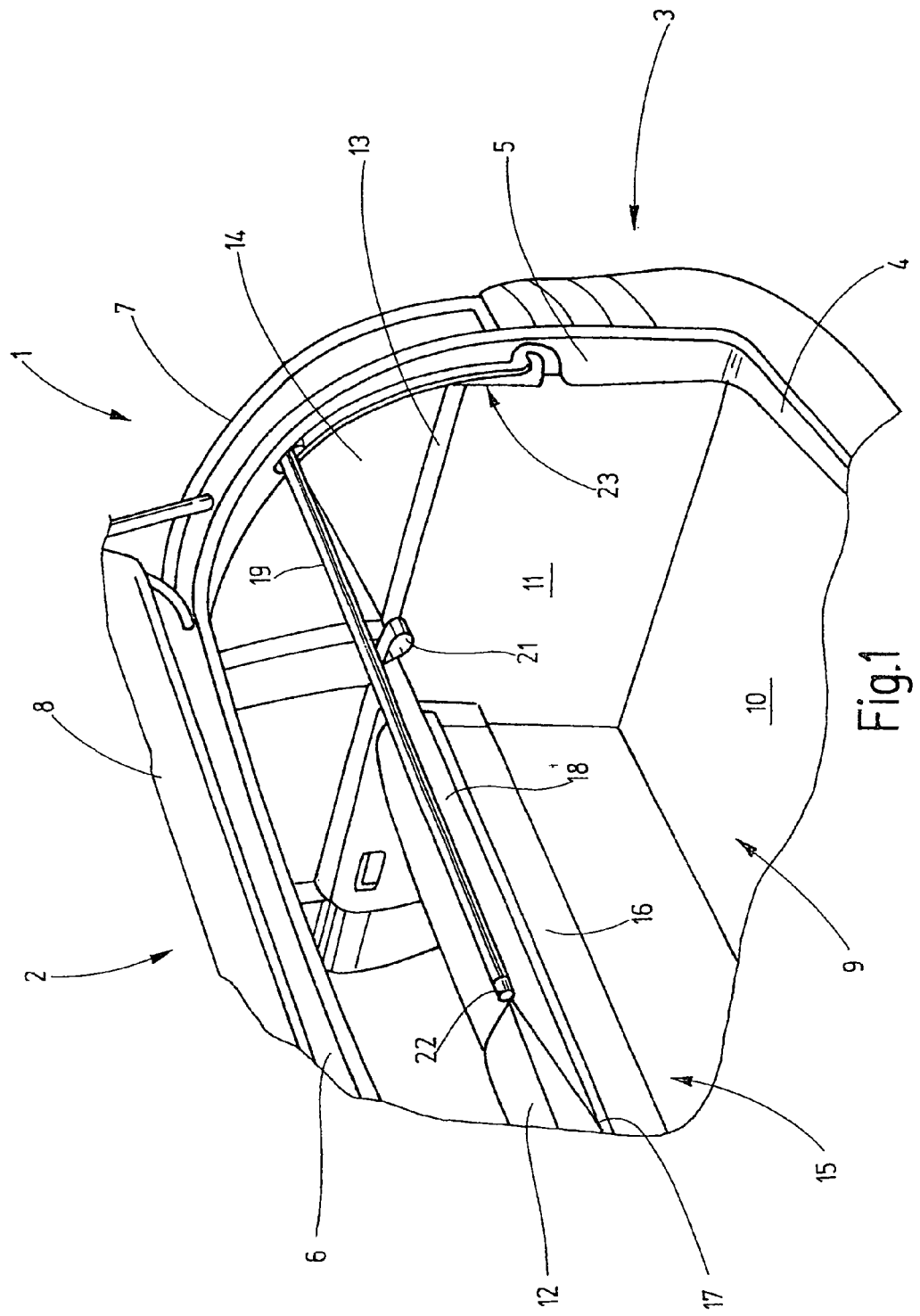
FIG. 1 is a partially cutaway perspective view of the cargo compartment area of an exemplary station wagon equipped with a cargo compartment cover according to the invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Referring to FIG. 1 of the drawings, there is shown a section from a rear part 1 of a station wagon 2. The rear opening 3 of the station wagon is bounded by a lower edge 4, a side edge 5, an upper edge 6 and an additional edge arranged opposite and symmetric to the illustrated side edge 5. The side edge 5 is formed in the upper area by a D-column 7. A tailgate 8 is hinged in the area of the upper edge 6 of the rear opening 3.

The illustrated station wagon 2 has in its interior an approximately rectangular cargo bay 9 that is bounded by a bottom 10, a right-hand side wall 11, the backside of a rear seatback 12 and a left-hand side wall arranged opposite and symmetric to the illustrated side wall 11. The two side walls 11 terminate at a lower window edge 13, above which a rear side window 14 is provided.

In order to close off cargo bay 9, a cargo compartment cover 15 is provided. The cargo compartment cover 15 includes a cassette-like elongated housing from which a cover sheet 18 can be pulled out of a slot 17. A winding shaft which is biased by a spring motor in a roll-up direction of the cover sheet is rotatably seated in the cassette-like housing. The cover sheet 18 has a rectangular shape corresponding to the rectangular upper opening of the cargo bay 9.

Figure 2:
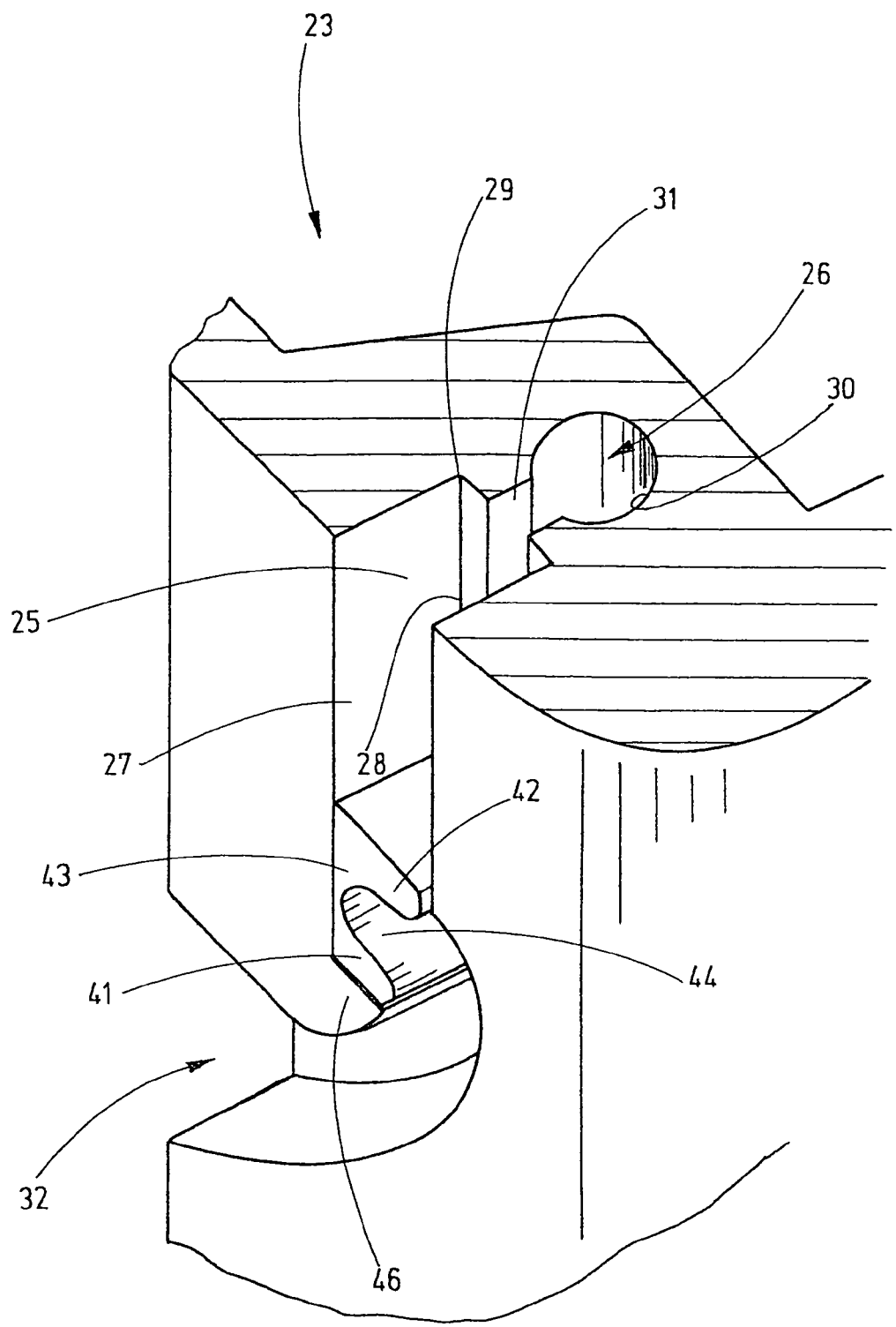
FIG. 2 is an enlarged perspective view of the lower end area of the right-hand guide rail arrangement from the station wagon of FIG. 1.

A pull rod 19 that has a holding loop 21 roughly in its center is fastened to the movable edge of cover sheet 18. The pull rod 19 has lateral pins 22 projecting past the cover sheet 18 which guide the pull rod 19 in guide rail arrangements 23. The guide rail arrangements run parallel to one another. The structure of the guide rail arrangements is shown in FIG. 2.

The illustrated guide rail arrangement 23 is contained in the area of the D-column 7 and begins below roughly the height at which the lower window edge 17 is located. The guide rail arrangement 23 follows the contour of the D-column 7 upwards. The guide rail arrangement 23 can, for instance, be integrated into the interior trim part of the D-column 7. As shown in FIG. 2, the guide rail arrangement 23 is composed of a first guide groove 25 and a second guide groove 26.

The first guide groove 25 is bounded by two side walls 27 and 28 and a back wall 29. The two side walls 27 and 28 are parallel to one another and are spaced apart a distance corresponding roughly to the diameter of the pin 22. The guide groove 25 opens in the direction towards the opposite, not shown side edge.

In cross section, the guide groove 26 includes a groove chamber 29 and a groove slot 31. The groove chamber 29 has a circular cross section, while the groove slot 31 is rectangular. As shown in FIG. 2, the groove slot 31 connects the groove chamber 29 to the first guide groove 25, for which it opens centrally into the back wall 29.

A corresponding opposing guide rail arrangement 23 is provided in a mirror-image manner on the not shown opposing D-column.

At its lower edge, the first guide groove 25 forms an inlet funnel 32, the opening of which points in the direction towards the rear seatback 12. Starting from this opening, the inlet funnel 32 runs with a reduced width at about an angle of 180°, issuing then at its lower end into the first guide groove 25 through the wall 28.

Figure 3:
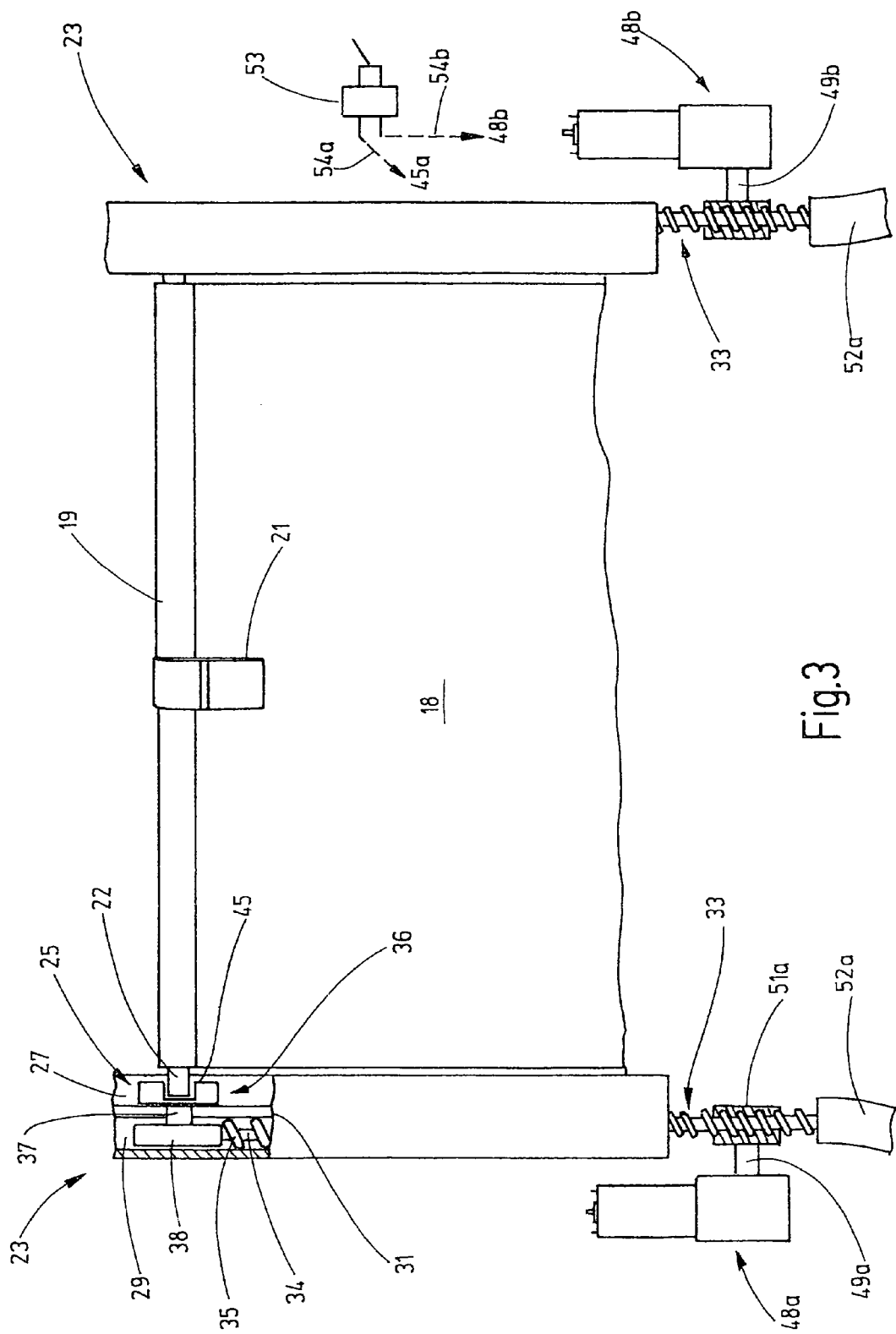
FIG. 3 is a partially cutaway plan view of the cargo compartment cover of FIG. 1 showing the drive arrangement.

The drive arrangement of the cargo compartment cover 15 is shown in part in FIG. 3. Two guide rail arrangements 23 to the right and left of the cover sheet 18 are shown in FIG. 3. The right-hand guide rail arrangement 23 is shown closed, while the left-hand guide rail arrangement 23 is partially broken open. In the broken open area, the first guide groove 25 with its side wall 27 facing the front of the vehicle can be seen as well as one wall of the slot 31 and the circular groove chamber 29. The groove chamber 29 serves to guide a linear actuating element 35 that transmits compressive and tensile forces in a manner secured against buckling. The actuating element 33 includes a flexible cylindrical core 34 and a coil 35 mounted immovably thereon. This produces a kind of flexible rack with circumferential helical gearing. Since it is guided in the chamber 39 with low radial play, the actuating element cannot buckle laterally and is able to transmit compressive forces. A corresponding linear actuating element 33 also runs in the right-hand guide rail arrangement 23.

In order to couple the actuating member 33 to the pull rod or its pin 22, a coupling member 36 is provided. The coupling member 36 is rigidly connected to a slider 38 via a neck part 37 that runs through the slot 31. The slider 38 is a cylindrical part that is slidingly guided in the chamber 29. The slider 38 is connected resistant to compression and tension to the upper end of the actuating member 33, so that tensile and compressive forces can be transmitted to the coupling part 36 by the actuating member 33.

The coupling member 36 which can be seen in FIG. 2, has the shape of a fork piece with two legs 41 and 42 which are connected to one another via a back piece 43. The two legs 41 and 42 define a roughly parallel-sided jaw 44 that points in the direction of the wall 28, i.e. in the direction towards the rear opening 3. The two legs 41 and 42 are additionally connected to one another via the wall 45, from which the connecting piece 37 projects. In its external shape, the coupling part 32 is approximately cubic. It nearly fills up the guide groove 25, as shown.

The travel of the coupling part 36 is limited towards the bottom by a stop surface 46 that projects perpendicularly from the wall 25 and simultaneously forms part of the inlet funnel 32. A corresponding stop is provided at the upper end of the guide rail arrangement 23, only in the form of the closed end of the guide groove 25.

In order to move the actuating members 33, a respective gear motor 48a and 48b is provided at the lower end of each guide rail arrangement 23. The tube gear motors 48a and 48b are identical in construction and, if appropriate, symmetrical. Each gear motor 48a, 48b has an output shaft 49a and 49b of its own. A crown gear 51a, which is shaped such that it can be brought into positive engagement with the linear actuating member 33, is seated on the output shaft 49a. It is understood that the crown gear 51a runs in a casing and that actuating member 41 is guided though a bore in the casing past the crown gear 51a and can be kept in engagement with the crown gear 51a. The gear casing for the two gear motors 48a and 48b is omitted from the drawings only for reasons of illustration.

The projecting part of the actuating member 33 runs as a load-free section into the storage tube 52a. The storage tube 52a can be placed as desired behind the trim panel of side wall 11.

The components described in connection with the gear motor 48a and its connection to the actuating member 33 are also applicable to gear motor 48b and are labeled there by the same reference numbers with b added.

The two gear motors 48a and 48b are each connected to a schematically indicated common switch 53. The switch 53 allows the two gear motors to be connected with one polarity or the other to the onboard power system of the motor vehicle. The connecting lines are indicated at 54a and 54b with broken lines. The switch 53 can be actuated by the movement of the tailgate 8.

As will be appreciated, the switch can be replaced by a relay control, the input switch of which is likewise connected to the tailgate 8. The current flow path is not otherwise shown, because it is neither the subject matter of the invention nor necessary for the understanding of the invention.

For the sake of completeness, a winding shaft to which the appropriate edge of cover sheet 18 is fastened is rotatably seated inside the cassette-like elongated housing 16. The winding shaft is biased by a spring motor in the rolling out direction of the cover sheet 18.

Other details and/or dimensions follow implicitly from the following explanation of the operation and function of the illustrated embodiment. In the opening or open position, the cover sheet 18 is completely rolled up onto the winding shaft in the cassette housing 16. The pull rod 19 rests against the slots of the cassette housing 16. The controller for the cargo compartment cover 15 is switched to manual operation by a control switch provided in the vicinity of the rear opening, which means that the coupling parts 36 in the two guide rail arrangements 23 are in the lower position as in FIG. 2 regardless of whether the tailgate 3 is open or closed. The user can grasp loop 21 as desired and move the pull rod 19 towards himself in the direction towards the rear opening 3. At the end of the movement, the user guides the two laterally projecting pins 22 via the inlet funnel 32 present in each guide rail arrangement 23 into the jaw 44 of each coupling part 36 and hooks it there. This is the closed position in which the cargo bay 9 is protected from view from the top. After closure of the tailgate 8, the cargo bay is completely closed off.

After the opening of the tailgate 8, the user will find the cover sheet 18 in the closed position in which the pull rod 19 is in the vicinity of the rear opening 3, so long as the control lever is in manual operation. If the control switch is switched to intermediate operation, the electronics present in the vehicle ensure that the switch 53 will be actuated as a function of the position or movement of the tailgate 8. With a closed tailgate 8, the cargo compartment cover remains in the lower position in which the cover sheet 18 runs substantially horizontally, even in the setting for forward operation. When the tailgate 8 is opened with intermediate operation switched on, the two gear motors 48a and 48b are switched on via the control switch 53. They move with the direction of rotation such that the two motors 48a and 48b move the actuating members 33 coupled to them by gears 51a and 51b practically synchronously from the lower position shown in FIG. 2 to the upper position shown in FIG. 1.

Since the pull rod 19 is positively coupled to the coupling parts 36, the cover sheet 18 will move upwards as shown in FIG. 1. In the upper position, the pull rod 19 is in the vicinity of the upper edge 6 of the rear opening 3 as shown, such that access to the cargo bay 9 is largely unhindered without the user being compelled to manipulate the cargo compartment cover 15 manually in advance.

When the user closes the tailgate 8, the controlled switch 53 is moved in the opposite direction, whereby the two gear motors are connected with opposite polarity to the onboard electrical system of the motor vehicle. They turn in the opposite direction and pull the actuating members 33 back into the position as in FIG. 2. The deployed cover sheet 18 is pivoted downwards in the process, and moves from the intermediate open position shown in FIG. 1 into the closed position.

The two gear motors 48a and 48b run unsynchronized either electrically or mechanically, i.e. each of the two motors 48a, 48b runs at its own actual speed. These speeds will be very close together since the motors are identical construction and have the same nominal speed. Insofar as differences between the two actuating members 33 actually appear in the operating travel from the closed position into the intermediate open position or back, their travel will be equalized at the end of the movement by the positively engaging stops defined by the surface 46 or the upper closed end of the guide groove 25. Independent of the operating speed, the stops ensure that in the position in which the travel of coupling part 36 is blocked, and thus the associated gear motor 48 is also shut off, the proper position has been reached.

Since the configuration of the manual control electronics is not important to the present invention, it need not be described in detail. It is sufficient to mention that the motors can no longer rotate and the motor current is then cut off. As is known from the prior art, this shut-off can be time-controlled or current-controlled, or each of the motors can be connected to a limit switch bridged via a diode.

The advantage of this arrangement is that motors 48 can be mounted immediately underneath the lower end of the guide rail arrangement 23 on each side of the vehicle behind the side trim. This can provide a particularly good dampening of sound. The operation of the motors is unable to generate any intrusive chassis resonances. Furthermore the operating length of the actuating members 33 is short and the friction losses minimal. The storage tube for the load-free section can be kept correspondingly short. It can consist of a flexible tube that can be placed essentially where desired in the vehicle. In any case it is not necessary for the storage tube to be shaped in a special manner in advance. Compared to the prior art, the present invention saves the expense of electrical synchronization units or mechanical coupling between the two actuating members 33, which would be difficult to position and would also result in additional friction losses.

So long as a control lever is in the intermediate position when the tailgate 8 is opened and closed, the cover sheet 18 will be moved back and forth from the closed position, in which pull rod 19 is at the lower end of guide rail arrangement 23, and the intermediate position in which it is at the upper end. By switching the controller to manual operation, the two motors are turned on, more particularly in such a manner that they move coupling part 36 downwards into the position as in FIG. 2. The user can now operate cargo compartment cover 15 manually in the customary manner.

It is evident that, in the embodiment according to FIGS. 1 and 2, the intermediate position lies outside the plane in which pull rod 15 is moved from the closed position into the open position. An alternative embodiment in which the intermediate position lies in the plane that is defined by the open and closed positions is shown in FIG. 4. The essential difference with respect to the embodiment of FIG. 4 is that the guide rail arrangement 23 is now no longer housed in the D-column 7, but rather runs underneath the lower window at 17. The guide rail arrangement 23 has a length corresponding roughly to half the travel of pull rod 19, furnished here with a contour part 56, when it is moved back and forth between the open and closed positions.

The guide rail arrangement 23 of FIG. 4 further differs from the embodiment of FIG. 2 in that only one side wall 27 is present as a lower side wall, as well as the rear wall 29. A slot 31, behind which second guide groove 26 runs, is provided in the rear wall 29. The wall 27 also forms a sliding contact surface for coupling part 36 which is shown in the intermediate position in FIG. 4. For aesthetic reasons, the guide rail arrangement 23 has an extension reaching up to the cassette housing 16, in which for instance, the respective gear motor 48 and the storage and 52 for the load-free section can be housed.

In the right upper half, FIG. 4 shows the cargo compartment cover 15 in the open position. As already mentioned, the pull rod 19 rests against slot 17 of cassette housing 16 in this position. The lower left part of FIG. 4 shows cargo compartment cover 15 in the closed position. In this instance, the cover sheet 18 is maximally extended so that the pull rod 19 is situated in the vicinity of the rear opening 3. The contour part 56 closes off the segment-shaped gap that might be present between the straight pull rod 19 and the inside of tailgate 8.

In the closed position according to the lower left half of FIG. 4, the cover sheet 18 is held by virtue of the fact that the coupling part 36, whose open jaw 44 points in the direction of the tailgate 3, has been brought into the other end of position. In this position, the coupling part 36 lies in the vicinity of the rear opening 3.

For the embodiment shown in FIG. 4, no changeover between intermediate and manual operation is necessary. If the user wishes to have full, unhindered access to cargo bay 9, he brings the cargo compartment cover 15 into the position shown in the upper right-hand half of FIG. 4.

In order to close the cargo bay 9, a user grasps the contour part 56 by the handle provided and guides the contour part up to the coupling part 36 arranged in the vehicle at the position shown on the right and left. There the user hooks in the projecting pins 22 of pull rod 19, placing the cargo compartment cover 15 is in the intermediate position. Upon closing of the tailgate 7, as previously explained, the two gear motors 48 that move the actuating members 33 run behind the rear wall 29 and the guide groove 25 are set in motion. Against the force of the spring motor, the pull rod 19 is brought in the direction towards the rear opening 3 into the closed position according to the bottom left of FIG. 4, simultaneously pulling out the cover sheet 18.

At the end of the travel, the motors 48 are automatically shut off, as previously explained. In the embodiment according to FIG. 4 as well, the motor is automatically shut off after the end of travel has been reached on the corresponding side, in order to prevent thermal overload.

Otherwise the structure of the guide rail arrangement 23 is the same as was already explained in conjunction with FIG. 2, with the only exception being that the guide rail arrangement 23 runs horizontally and only an L-shaped groove consisting of the lower wall and the rear wall is provided as the guide groove 25 instead of the slot shaped groove. The coupling part 36 is mechanically connected to the associated actuating member in the same manner as in FIG. 2.

As explained above, the motors are set in motion in the opposite direction when the tailgate 7 is opened, and move the pull rod 19 back into the intermediate position. If the user would like to completely open the cargo bay 9, it is sufficient if he grasps the contour part 56, unhooks the pin 52 by a brief movement in the direction towards the rear opening 3, and then moves the cover sheet in the direction towards the cassette housing 16 as with a normal manually operated roll-up cover.

The embodiment of FIG. 4 has the advantage that the user can employ the partially extended cover sheet 18 in the intermediate position as a temporary shelf when he wishes to load or unload the cargo bay 3.

A cargo compartment cover is provided that includes guide rail arrangements on either side of the cover sheet in order to bring the cover sheet into a intermediate position starting from the closed position. To transfer the cover sheet between these two positions, two separate gear motors are provided which are not synchronized together. The gear motors run completely independently of one another electrically and mechanically.

The invention claimed is:

1. A cargo compartment cover for closing off an upper access opening of a cargo bay of a motor vehicle having a rear opening comprising:
   a rotatably supported winding shaft;
   a cover sheet having a first end fastened to the winding shaft, the cover shaft being movable between an open position wherein maximum access is allowed through the upper access opening of the cargo bay, a closed position wherein a top of the cargo bay is completely closed off, and an intermediate position wherein the top of the cargo bay is partially open;
   a pullout bar that is fastened to a second end of the cover sheet, remote from the winding shaft;
   two guide rail arrangements that extend along a path that the pullout bar follows when the cover sheet is moved into the intermediate position starting from the closed position;
   two linear actuating members each of which runs in a respective one of the guide rail arrangements;
   positively engaging stops for limiting the travel of actuating members;
   two coupling members for positively coupling a respective actuating member to one end of the pullout bar at least relative to one direction of movement;
   two gear motors, each operating at the same nominal speed and each having a permanently excited DC motor; and
   wherein the two gear motors operate completely independently of one another mechanically and electrically, and the arrangement is free of devices for electrically synchronizing gear motors with one another during their operation.

2. The cargo compartment according to claim 1, wherein each guide rail arrangement extends for at least some distance next to a respective side of the rear opening of the cargo bay in a direction towards a roof of the motor vehicle.

3. The cargo compartment according to claim 1, wherein each guide rail arrangement extends next to a respective side of the cargo bay beginning at the rear opening in a direction towards a rear seatback of the motor vehicle.

4. The cargo compartment according to claim 1, wherein each actuating member has teeth on its outer surface.

5. The cargo compartment according to claim 4, wherein each gear motor carries an output gear and each actuating member being in positive engagement with the respective output gear.

6. The cargo compartment according to claim 1, wherein each guide rail arrangement is integrated into a D-column in the motor vehicle.

7. The cargo compartment according to claim 6, wherein each guide rail arrangement terminates at a lower end in an insertion funnel having an opening that points in a direction towards a front end of the cargo bay.

8. The cargo compartment according to claim 1, wherein each guide rail arrangement comprises a first guide groove in which the respective coupling member runs.

9. The cargo compartment according to claim 8, wherein each guide rail arrangement includes a second guide groove that opens via a slot into the first guide groove and adjoins the first guide groove.

10. The cargo compartment according to claim 9, wherein the second guide groove is an undercut groove including in cross section a groove chamber and a groove slot, wherein the width of the groove slot is less than the width of the groove chamber measured in the same direction.

11. The cargo compartment according to claim 9, wherein the groove chamber has dimensions such that a respective one of the actuating members running therein is guided secured against buckling.

12. The cargo compartment according to claim 9, wherein the first guide groove is defined by two parallel sides and a rear wall, the slot of the second guide groove opening into the rear wall of the first guide groove.

13. The cargo compartment according to claim 9, wherein the first guide groove is defined by two walls situated at an angle with respect to one another and the second guide groove extends into one of the two walls.

14. The cargo compartment according to claim 9, wherein a slider is connected to the coupling member contained in the first guide groove and runs in the second guide groove.

15. The cargo compartment according to claim 1, wherein each coupling member has a fork-shape with two legs that define a slot opening.

16. The cargo compartment according to claim 15, wherein the slot opening points in a direction parallel to a direction of motion of the coupling member.

17. The cargo compartment according to claim 15, wherein the slot opening points in a direction perpendicular to a direction of motion of the coupling member.

* * * * *

UNITED STATES PATENT AND TRADEMARK OFFICE
CERTIFICATE OF CORRECTION

PATENT NO. : 7,621,577 B2 Page 1 of 1
APPLICATION NO. : 11/904428
DATED : November 24, 2009
INVENTOR(S) : Warner Schlecht It is certified that error appears in the above-identified patent and that said Letters Patent is hereby corrected as shown below:

Title Page, Item (30), Foreign Application Priority Data
The last Priority Entry, Replace "September 27, 2007 (DE) ....10 2006 046 064" with
--September 27, 2006 (DE) ....10 2006 046 064--

Signed and Sealed this

Sixteenth Day of February, 2010

David J. Kappos
*Director of the United States Patent and Trademark Office*